United States Patent
Quantz et al.

(10) Patent No.: US 6,588,328 B1
(45) Date of Patent: Jul. 8, 2003

(54) CRACKING UNIT FOR HIGH PRODUCTION NUTCRACKING APPARATUS

(75) Inventors: James B. Quantz, Lexington, SC (US); Pascal W. Pitts, Cayce, SC (US); John L. Feaster, Columbia, SC (US)

(73) Assignee: Machine Design Incorporated, West Columbia, SC (US)

( * ) Notice: Subject to any disclaimer, the term of this patent is extended or adjusted under 35 U.S.C. 154(b) by 0 days.

(21) Appl. No.: 10/299,416

(22) Filed: Nov. 19, 2002

(51) Int. Cl.⁷ .................................................. A23N 5/00
(52) U.S. Cl. ............................ 99/571; 99/574; 99/581
(58) Field of Search ........................... 99/568, 571–576, 99/577–579, 580–583, 600; 426/481, 482; 30/120.1–120.5; 198/622

(56) References Cited

U.S. PATENT DOCUMENTS

| | | | |
|---|---|---|---|
| 1,160,376 A | * 11/1915 | Gilson | 99/569 |
| 1,208,324 A | * 12/1916 | Canale | 99/572 |
| 1,342,691 A | * 6/1920 | Pape | 99/582 X |
| 1,470,247 A | * 10/1923 | Wilms | 99/572 |
| 1,901,798 A | * 3/1933 | Boomer | 99/586 X |
| 2,067,566 A | * 1/1937 | Field | 99/582 |
| 2,635,662 A | * 4/1953 | Doering et al. | 198/622 X |
| 2,903,134 A | * 9/1959 | Ashlock, Jr. | 99/569 X |
| 3,561,513 A | * 2/1971 | Lindsey | 99/571 |
| 3,621,898 A | * 11/1971 | Turner | 99/571 |
| 3,871,275 A | 3/1975 | Quantz | |
| 4,332,827 A | 6/1982 | Quantz | |
| 4,418,617 A | 12/1983 | Quantz | |
| 4,441,414 A | 4/1984 | Quantz | |
| 5,623,867 A | 4/1997 | Quantz | |
| 6,182,562 B1 | 2/2001 | Quantz et al. | |
| 6,205,915 B1 | 3/2001 | Quantz | |

* cited by examiner

*Primary Examiner*—Timothy F. Simone
(74) *Attorney, Agent, or Firm*—Alston & Bird LLP

(57) ABSTRACT

A nutcracking unit which is adapted for use in a high production nutcracking apparatus of the type wherein a nut is held between an anvil and cracking die, and a shuttle then impacts against the rear end surface of the cracking die to sharply advance the cracking die and thereby crack the shell of the nut. The cracking die and the anvil have opposing concave cracking surfaces for supporting a nut therebetween, and each of the concave cracking surfaces is defined by an outwardly bowed convoluted curve made with circle arcs when viewed in cross section. This configuration allows a relatively small nut, such as a pecan seedling, to be engaged and cracked at a point spaced from the pointed end of the nut, which in turn results in fewer uncracked or insufficiently cracked nuts.

14 Claims, 2 Drawing Sheets

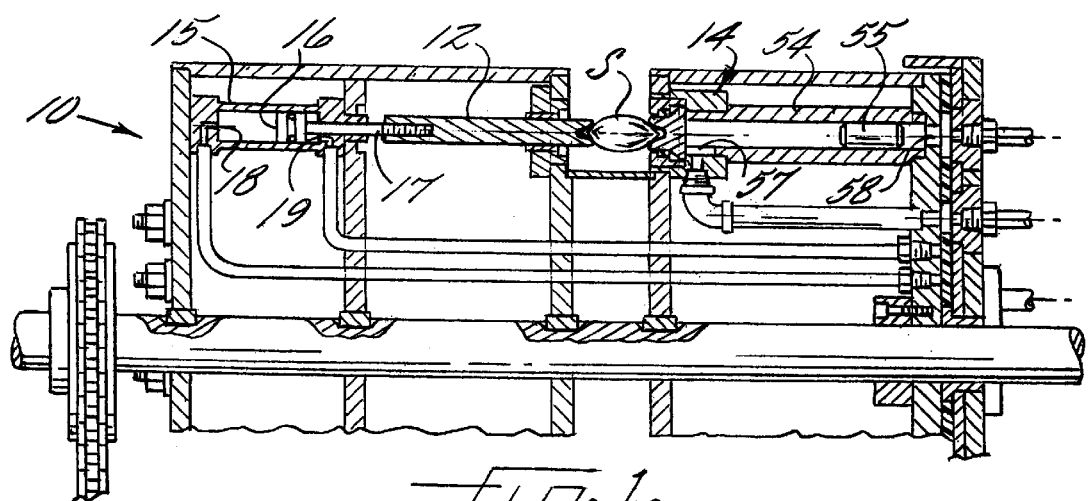
Fig. 1.
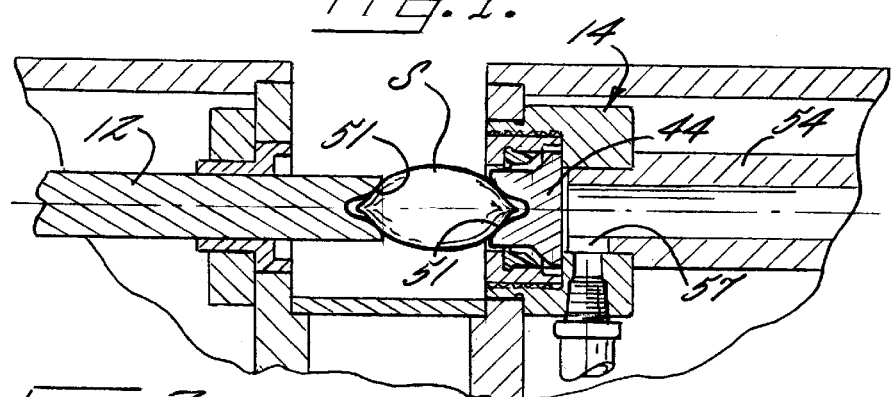
Fig. 2.
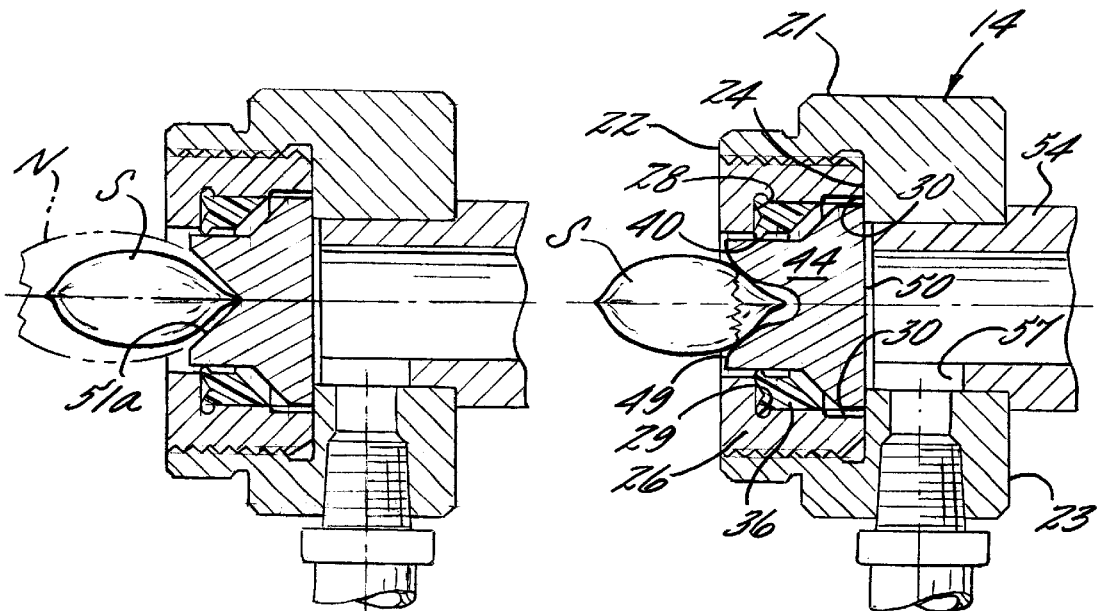
Fig. 3.
(PRIOR ART)
Fig. 4.

CRACKING UNIT FOR HIGH PRODUCTION NUTCRACKING APPARATUS

BACKGROUND OF THE INVENTION

The present invention generally relates to an improved nutcracking unit for use in a high production nutcracking apparatus.

In applicant's prior U.S. Pat. Nos. 5,623,867 and 6,205,915, there is disclosed a high production nutcracking apparatus wherein a plurality of cracking units are arranged on a rotatable turret, with each cracking unit having an opening adapted to receive an individual nut which is removed from a feed conveyor as the cracking unit moves through a pickup position. Each cracking unit includes an anvil mounted on one side of the opening, and a cracking die mounted for limited movement on the other side of the opening and so that the anvil and cracking die are adapted to receive and hold the nut therebetween. A free floating shuttle is mounted rearwardly of the die, and the shuttle is thrust forwardly into impacting engagement with the rearward side of the cracking die after the nut is receive in the opening, and so that the shell of the retained nut will be cracked by the resulting forward movement of the die.

The above patents and applicant's further U.S. Pat. No. 6,182,562 disclose a cracking die and anvil which are configured so as to include opposing end faces which are of conical configuration for partially receiving the opposite ends of the nuts which are held therebetween.

During the processing of relatively small nuts which commonly have pointed ends, such as pecan seedlings, the impact of the cracking force will be imparted directly on the pointed end of the nut by the conical surfaces, rather than on the side walls of the nut. As a result, the impact force will crush the pointed ends of the nuts, but leave much of the remainder of the shells attached to the meat of the nut, and a high percentage of the nuts have attached shell fragments which remain attached even after the nuts are subsequently processed in conventional shelling and air separation machines.

It is accordingly an object of the present invention to provide an improved nutcracking apparatus of the described type which is able to efficiently process relatively small nuts, such as pecan seedlings.

SUMMARY OF THE INVENTION

The above and other objects and advantages of the invention are achieved by the provision of a nutcracking unit of the described type which is adapted to efficiently crack relatively small nuts such as pecan seedlings which have pointed ends, and wherein the cracking die and anvil have opposing concave cracking surfaces for receiving an end portion of the nut therein and which are configured in such a way that the cracking impact force is applied about an annular circle which is axially spaced from the pointed end of the nut. This in turn causes the formation of relatively small end caps at the opposite ends of the nut which are broken and easily separated, thereby facilitating the separation of the meat of the nut from the shell, either in the cracking unit or in the downstream shelling and air separation machines. The percentage of partially or insufficiently cracked nuts is thus reduced.

To achieve this result, the configuration of the concave cracking surfaces of both the cracking die and anvil are defined by non linear, side walls when viewed in cross section which are adapted to engage the received nut at a location axially spaced a relatively short distance from the pointed end of the nut. In a preferred embodiment, the side walls are defined by an outwardly bowed convoluted curve made with circle arcs when viewed in cross section. Also, the bottom end portion of the concave cracking surface is defined by an arc of a circle when viewed in cross section, with the arc having a radius of at least about $1/16$ inch.

With the above configuration, the pointed end of the nut may be received in the concave end portion of either or both the anvil and the cracking die, with the pointed end of the nut spaced from the bottom end portion and adjacent walls of the concave cracking surface. The impact force is thus removed from the pointed end of the nut, and moved axially so as to be imparted along an annular circle surrounding and spaced from the end of the nut as described above.

BRIEF DESCRIPTION OF THE DRAWINGS

Some of the objects of the invention having been stated, other objects and advantages will appear as the description proceeds, when taken in conjunction with the accompanying drawings, in which FIG. 1 is a fragmentary sectional side elevation view of a cracking unit of a nutcracking apparatus which embodies the features of the present invention;

FIG. 2 is an enlarged fragmentary view of a portion of the cracking unit of the apparatus illustrated in FIG. 1;

FIG. 3 is a sectional view of the prior art cracking die assembly used in a cracking unit of the type illustrated in FIGS. 1 and 2;

FIG. 4 is a view similar to FIG. 3 and illustrating the cracking die assembly of the present invention;

DETAILED DESCRIPTION OF THE INVENTION

Figure 5:
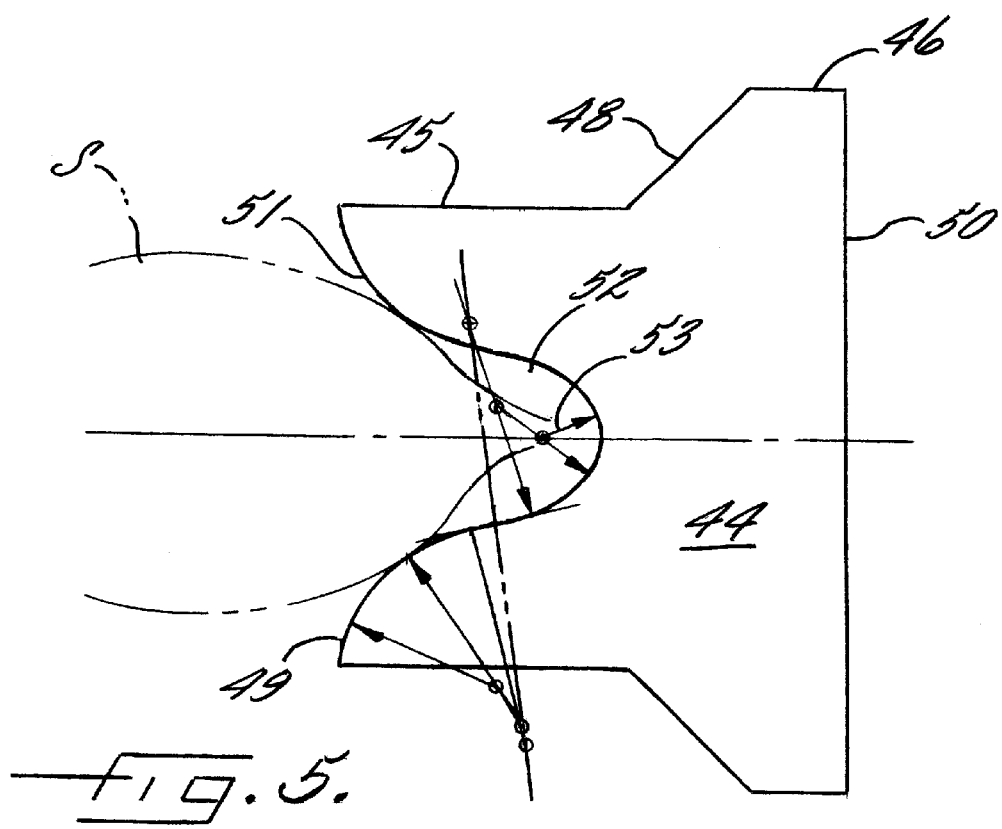
FIG. 5 is an enlarged cross sectional view of the cracking die of the invention.

Referring more particularly to the drawings, there is illustrated in FIG. 1 a cracking unit 10 of a high production nutcracking apparatus which embodies the features of the present invention. While a single unit 10 is illustrated, it will be understood that in a preferred embodiment, several such units are mounted on a rotatable turret as disclosed in applicant's prior U.S. Pat. Nos. 3,871,275; 4,332,827; 5,623,867; 6,182,562 and 6,205,915, the disclosures of which are expressly incorporated herein by reference.

The cracking unit 10 comprises an anvil 12, a cracking die assembly 14, and means mounting the anvil and cracking die assembly in an axially aligned, opposed relationship to define an opening for receiving a nut S therebetween. More particularly, the means for mounting the anvil 12 includes a first air cylinder 15, a piston 16 slideably disposed within the cylinder, a piston rod 17 interconnecting the piston and anvil, a first air port 18 disposed adjacent the rearward end of the cylinder 15, and a second air port 19 disposed adjacent the forward end of the cylinder. As will be apparent, movement of the piston 16 results in a corresponding movement of the anvil 12, either forwardly toward the cracking die assembly 14 or rearwardly therefrom. Such movement is controlled by air which is selectively provided to the first and second ports in a manner more fully disclosed below, and as further described in applicant's above noted prior patents.

The cracking die assembly of the present invention is illustrated in FIG. 4 at 14 and it includes a mounting sleeve 21 defining a forward end 22 and a rearward end 23, and which has a stepped internal cylindrical bore which includes a forwardly facing radial shoulder 24 intermediate the ends.

A tubular retainer 26 is coaxially mounted in the forward end portion of the sleeve bore, and the retainer 26 includes a stepped internal cylindrical bore which is coaxial with the bore of the sleeve 21 and which includes a rearwardly facing shoulder 28 intermediate its ends and which is spaced oppositely from the sleeve shoulder 24. The bore also includes an annular channel 29 adjacent the shoulder 28, and the rearward end portion of the bore includes a pair of slots 30 spaced 180° apart for the purpose explained below.

The retainer 26 is removably mounted in the sleeve bore by means of cooperating threads, and so that its inner end engages the shoulder 24 of the sleeve. A plurality of indentations (not shown) are provided in the front end face of the retainer to permit the retainer to be mechanically gripped by a suitable spanner wrench for rotation relative to the sleeve and removal therefrom to facilitate periodic cleaning or repair.

An annular gasket 36 is mounted within the internal bore of the retainer 26, so as to rest against the shoulder 28, and the annular gasket 36 has a rearwardly facing conical end face which is spaced from the radial shoulder 24 of the sleeve 21. The gasket 36 is preferably composed of a high density plastic material, such as the urethane identified as Product No. P4300A90 by Dupont. The gasket is formed by molding so as to include a peripheral ring which is received in the annular channel 29 adjacent the shoulder. Thus the annular gasket 36 is fixed within the internal bore 28 so as to prevent relative movement in both axial directions. The annular gasket 36 also includes an integral sealing lip 40 which extends radially inwardly.

A cracking die 44 is mounted coaxially within the retainer 26. The die 44 is preferably composed of a solid metallic material, such as an aluminum alloy, and it has a generally cylindrical configuration which defines a longitudinal central axis. The die includes a cylindrical forward end portion 45 which is received within the opening of the gasket 36 and a radial flange 46 which is closely received within the rearward bore portion of the retainer 26 adjacent the shoulder 24. The flange 46 has an axial dimension less than the distance between the sleeve shoulder 24 and the conical end face of the gasket 36, so as to permit limited axial movement of the die. Also, the flange 46 of the die 44 includes a forwardly facing conical shoulder 48 which opposes the conical end face of the gasket 36 and which has an inclination which matches the inclination of the conical end face of the gasket. Preferably, the inclination of those mating surfaces is between 30° and 60°, and most preferably is about 45°.

The cylindrical forward end portion 45 of the die 44 extends forwardly from the conical shoulder 48, through the gasket 36, and to a front end face 49. The sealing lip 40 of the gasket engages the cylindrical portion 45 about its entire periphery so as to prevent the passage of foreign substances past the cracking die during its axial movement.

The die 44 further includes a generally flat rearward end face 50 which is perpendicular to the central axis defined by the sleeve and retainer, and the front end face 49 has a concave cracking surface 51 formed therein which is adapted to receive an end portion of a nut such as a pecan seedling S, to be cracked. The anvil 12 has a similarly configured concave cracking surface 51, note FIG. 6.

In the prior art configuration as seen in FIG. 3, and which is further described in applicant's prior U.S. Pat. No. 6,182,562, the concave cracking surface is in the form of a cone with straight side walls and a pointed inner end, and thus the pointed end of a small nut such as a pecan seedling S is directly engaged at the bottom end of the conical cracking surface. A representative size comparison between a pecan seedling S and a standard hybrid pecan N is also schematically illustrated in FIG. 3.

Figure 6:
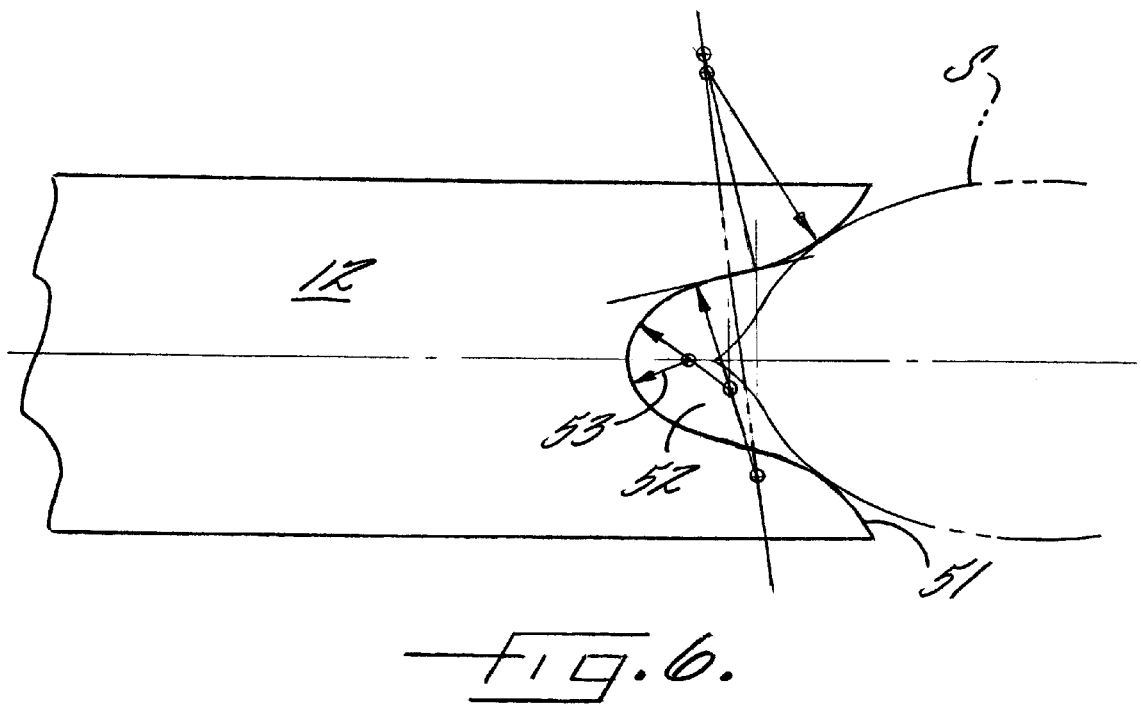
FIG. 6 is an enlarged cross sectional view of the anvil of the invention.

In accordance with the present invention, and as best seen in FIGS. 5 and 6, the concave cracking surfaces 51 of the cracking die 44 and anvil 12 are each configured to define non-linear, outwardly bowed side walls when viewed in cross section. As a result, a relatively large open inner end space 52 is formed, and the side walls of the concave cracking surfaces are adapted to engage the received nut at a location axially spaced from the pointed end of the nut. The pressure or contact point is thereby moved axially away from the point of the nut, so as to be located to engage the nut about a circle which is axially spaced from the end of the nut.

In the preferred embodiment as illustrated in the drawings, the side walls of the concave cracking surfaces 51 of the cracking die and anvil are defined by an outwardly bowed convoluted curve made with circle arcs when viewed in cross section. The phrase "convoluted curve made with circle arcs" is used in its generally accepted meaning, i.e., to describe a series of tangent arcs which have their centers lying on the common normal line at the point of tangency. Also, the curve may be further described as having a bottom end portion which is defined by an arc of a circle when viewed in cross section, with the arc having a radius 53 of at least about 1/16 inch and being located on the central axis of the die. Also, the arc defined by the radius 53 extends for at least about 60° (i.e. 30° on each side of the central axis) and preferably about 90°.

The above described convoluted curve allows the nuts S, which have different angular outside configurations, to self adjust so that each nut is engaged by the concave cracking surface 51 about an annular circle at the lowest possible location, i.e. as close as possible to the point of the nut. This causes the formation of relatively small shell end caps which readily separate from the meat of the nut, and this in turn facilitates the separation of the whole meat from the remainder of the shell.

The convoluted curve may be generated by a suitable cutting tool of a numeric controlled computerized lathe of conventional design and wherein the profile of the curve is cut in accordance with a predetermined program.

The cracking die assembly 14 further includes a second air cylinder 54 mounted coaxially at the rearward end of the sleeve 21, and a free floating shuttle 55 is mounted so as to be closely received within the bore of the air cylinder 54. In addition, there is provided an air port 57 adjacent the forward end of the cylinder 54, and a further port 58 which extends axially through the rearward end of the cylinder.

The control system for cyclically actuating the cracking unit includes an air control system whereby air is selectively introduced into the four ports 18, 19, 57, and 58. More particularly, upon receiving a nut S in the opening between the anvil 12 and cracking die assembly 14, air is first introduced into the port 18 so that the piston 16 and the anvil 12 are moved forwardly and such that the anvil 12 operatively engages one end of the nut S in the opening. The nut thereby becomes supported between the anvil 12 and the die 44, and the force provided by the anvil acts through the nut to move the cracking die rearwardly so that the flange 46 contacts the shoulder 24, as seen in FIG. 2. The anvil 12 and cracking die 44 thereby also serve to compressively stress the retained nut.

High pressure air is next injected through the port 58 and into the air cylinder 54, such that the shuttle 55 is thrust forwardly along the cylinder and impacts against the rearward end face 50 of the cracking die, causing the cracking die to sharply advance a short distance forwardly against the nut and thereby crack its shell. In the absence of a nut in the opening, the gasket 36 will absorb the entire impacting force, and even during normal cracking it is believed the gasket may absorb at least a significant portion of the impacting force. The air in the cylinder 54 which is in front of the advancing shuttle is permitted to exhaust through the port 57, and the slots 30 in the bore of the retainer 26 permit air to be released from the front side of the flange 46 during the forward movement of the die 44.

Air next enters the port 19, causing the piston 16 and the anvil 12 to move rearwardly and release the nut, and as a final step, air is caused to enter the port 57 and thereby return the shuttle 55 to its rearward position. The apparatus is then in position to receive another nut to be cracked, with the above cycle being cyclically repeated. Further details regarding the air control system for cyclically actuating the unit 10 may be obtained from applicant's above noted prior patents.

In the drawings and specification, there has been set forth a preferred embodiment of the invention, and although specific terms are employed, they are used in a generic and descriptive sense only and not for purposes of limitation.

That which is claimed:

1. A cracking member for use as an anvil or die in a nutcracking apparatus adapted to crack relatively small nuts which have pointed ends, such as pecan seedlings, comprising a solid body member of generally cylindrical configuration which defines a longitudinal central axis and a front end face which is transverse to said central axis, said front end face including a concave cracking surface for receiving therein the pointed end portion of a nut to be cracked, and wherein said concave cracking surface is configured to define non-linear side walls when viewed in cross section which are adapted to engage the received nut at a location axially spaced from the pointed end of the nut.

2. The cracking member of claim 1 wherein said side walls of said concave cracking surface define a bottom end portion which is defined by an arc of a circle when viewed in cross section, with the arc having a center located on said central axis and a radius of at least about 1/16 inch.

3. The cracking member of claim 2 wherein said side walls of said concave cracking surface further define an outwardly bowed convoluted curve made with circle arcs when viewed in cross section and which includes said arc of a circle.

4. A cracking member for use as an anvil or die in a nutcracking apparatus adapted to crack relatively small nuts which have pointed ends, such as pecan seedlings, comprising a solid body member of generally cylindrical configuration which defines a longitudinal central axis and a front end face which is transverse to said central axis, said front end face including a concave cracking surface for receiving an end portion of a nut to be cracked, with said concave cracking surface being defined by an outwardly bowed convoluted curve made with circle arcs when viewed in cross section.

5. The cracking member of claim 4 wherein the convoluted curve includes an arc of a circle at a bottom end portion of the concave cracking surface which has a center located on said central axis and a radius of at least about 1/16 inch, and wherein said arc extends for at least about 60°.

6. A cracking die assembly adapted for use in a nutcracking apparatus adapted to crack relatively small nuts which have pointed ends, such as pecan seedlings, and comprising a mounting sleeve having an internal bore which includes a forwardly facing radial shoulder intermediate its ends, a tubular retainer coaxially mounted in said sleeve bore forwardly of said shoulder, with said retainer including an internal bore and a radial shoulder which is spaced oppositely from said sleeve shoulder, a cracking die disposed coaxially within said bore of said sleeve, said cracking die comprising a generally cylindrical body which defines a longitudinal central axis and a front end face which is transverse to said central axis and a radial flange which is disposed between said retainer shoulder and said sleeve shoulder, with said flange having an axial dimension less than the distance between said shoulders for permitting limited axial movement of said die, and with said front end face of said die having a concave cracking surface which is adapted to receive the end portion of a nut to be cracked and which is defined by non-linear side walls when viewed in cross section which are adapted to engage the received nut at a location axially spaced from the pointed end of the nut, and with said cracking die further comprising a rearward end face which is opposite from said front end face, and a resilient annular gasket disposed about said die between said radial flange of said die and said retainer shoulder, whereby said cracking die is adapted to be impacted on said rearward end face and be thrust forwardly a limited distance so as to impart a cracking force to a nut received in the concave cracking surface of said die, and with the annular gasket adapted to absorb at least a portion of the impacting force.

7. The cracking die assembly of claim 6 wherein said side walls of said concave cracking surface define a bottom end portion which is defined by an arc of a circle when viewed in cross section, with the arc having a center located on said central axis and a radius of at least about 1/16 inch, and wherein said arc extends for at least about 60°.

8. The cracking die assembly of claim 7 wherein the side walls of said concave cracking surface further define an outwardly bowed convoluted curve made with circle arcs when viewed in cross section and which includes said arc of a circle.

9. The cracking die assembly of claim 6 wherein said die includes a cylindrical portion extending between said flange and said first concave end surface, and wherein said opposite end surface of said die is generally flat and transverse to said central axis.

10. The cracking die assembly of claim 9 wherein said retainer is removably mounted in said sleeve bore by means of cooperating threads.

11. A nutcracking apparatus comprising a cracking die having a front end face and a rearward end face, an anvil having a front end face and mounted opposite said front end face of said die to define an opening therebetween which is adapted to receive a nut, means mounting said cracking die for limited movement toward and away from said opening, means mounting said anvil for limited movement toward and away from said opening and for biasing said anvil in a direction toward said opening so that a nut may be retained between said front end faces of said anvil and said cracking die, a free floating shuttle mounted rearwardly of said cracking die, and means for periodically thrusting said shuttle forwardly into impacting engagement with said rearward end face of said cracking die such that a nut retained between said anvil and said cracking die will be cracked by the resulting forward movement of the cracking die, and wherein the front end face of each of said cracking die and said anvil comprises a concave cracking surface for receiving therein the pointed end of a nut to be cracked, and wherein said concave cracking surface is configured to define non-linear side walls when viewed in cross section which are adapted to engage the received nut at a location axially spaced from the pointed end of the nut.

12. The nutcracking apparatus of claim 11 wherein said concave cracking surface of each of said cracking die and said anvil is further defined by a bottom end portion which includes an arc of a circle when viewed in cross section, with the arc having a radius of at least about $\frac{1}{16}$ inch.

13. The nutcracking apparatus of claim 12 wherein said arc of a circle is centered on a central axis defined by said cracking die and extends for at least about 60°.

14. The cracking die assembly of claim 13 wherein the side walls of said concave cracking surfaces further define an outwardly bowed convoluted curve made with circle arcs when viewed in cross section and which includes said arc of a circle.

\* \* \* \* \*